United States Patent Office 3,474,176
Patented Oct. 21, 1969

3,474,176
REPELLING ANIMALS WITH KETONE
Stanley K. Freeman, Springfield, N.J., assignor to International Flavors & Fragrances, Inc., New York, N.Y., a corporation of New York
No Drawing. Filed Dec. 6, 1965, Ser. No. 512,015
Int. Cl. A61l 23/00
U.S. Cl. 424—331                     5 Claims This application relates to animal control compositions and methods, and more particularly, it relates to animal repellent compositions and to methods for repelling animals.

It is frequently desired to exclude animals from certain areas. Such a need to limit the movements of animals ranges from controlling large and/or dangerous carnivores such as bears, wolves, coyotes, and the like to controlling smaller animals such as rats, mice, squirrels, and the like.

While the more undesirable animals, including most of those mentioned above, can be controlled by such direct methods as baiting and trapping, it is usually undesirable to deal with domestic animals so severely. This is particularly true of domesticated animals such as cats and dogs which are pets and are generally allowed access to many areas in and around human habitation. It would be desirable to provide ways for excluding such domesticated animals from specific areas without otherwise materially limiting their freedom of movement.

In the past, attempts have been made to control domestic animals through the use of materials which would be repellent to the particular animal, and a number of animal repellent materials are known. However, these prior art materials suffer from a number of deficiencies. Some of the materials are relatively ineffective, and some of the more effective materials have such unpleasant odors that they tend to be distasteful to humans also. Other materials are so toxic that it is not possible to use them because of the possibility of accidental ingestion, either by the animals themselves or by humans.

This invention provides safe, effective compositions for controlling animals. This invention also provides safe methods for controlling animals.

Further and more specific objects, features, and advantages will clearly appear from the detailed description given below which forms a part of this specification and illustrates by way of example embodiments of the invention.

The invention comprises the novel compositions and component mixtures comprised in such compositions, as well as the novel methods and steps of methods, specific embodiments of which are described hereinafter by way of example only and in accordance with what is now considered the preferred manner of practicing the invention.

Briefly, the compositions of this invention comprise a suitable carrier and an aliphatic or alicyclic ketone containing from about 6 to about 20 carbon atoms. The ketones are present in the composition in amounts effective to repel animals from the area in which the compositions are applied. The method of this invention comprises treating an area with an aliphatic or alicyclic ketone having from about 6 to about 20 carbon atoms to repel animals from the treated area. Unless otherwise indicated, all parts, proportions, percentages and ratios herein are by weight.

Some compositions of this invention have been found to be especially adapted for use in pressurized aerosol dispensing containers. Accordingly, in certain preferred embodiments of this invention, the composition comprises an aliphatic or alicyclic ketone containing from about 6 to about 20 carbon atoms, a propellant, and generally a vehicle for the ketone. Such compositions are very conveniently and economically dispensed from aerosol containers, and rapidly produce the desired repellent action in the areas sprayed.

The effective repellent substances are ketones which contain from about 6 to about 20 carbon atoms, and preferably from about 7 to about 19 carbon atoms. The ketones can be saturated or unsaturated aliphatic or alicyclic materials. For some purposes it is preferred that the ketones be completely saturated, since in certain instances such ketones have been found to have superior stability. The ketones desirably used in this invention are exemplified by ethylbutyl ketone, methylisoamyl ketone, geranyl acetone, ethyl-n-amyl ketone, methyloctyl ketone, heptylidene acetone, isobutylheptyl ketone, methylundecyl ketone, methylhexyl ketone and 2-methyl-6-heptanone. Preferred ketones are ethylbutyl ketone, methylisoamyl ketone, and 4-t-amylcyclohexanone. By virtue of its high efficacy, safety, and persistence, methylnonyl ketone is a particularly preferred ketone for use in the practice of this invention.

It will be understood herein that the ketones can be used either pure or in commercially available form. They can also be used in admixture with one another in particular circumstances.

These materials are repellent to animals and permit a process for the control of animals. The process is carried out by applying effective amounts of the ketones of this invention to an area. The area is most effectively treated by applying the ketone and ketone-containing compositions to surfaces in the areas from which the animals are to be restricted. For temporary control or for special purposes, it is convenient to apply the ketonic material to an absorbent material such as paper, cloth, and the like, and then to place the absorbent material temporarily or permanently in the interdicted area. By virtue of lack of toxicity and freedom from unpleasant odors, this invention is particularly useful in controlling domestic animals such as dogs and cats.

The carriers for use in this invention can be selected from a wide group of liquid and solid materials suitable for applying the ketones of this invention to an area. The ketones can conveniently be applied to the area in the form of solutions or emulsions, or adsorbed or absorbed on solid materials, desirably finely divided solid materials such as dusts, powders, and the like, for example, attapulgite, bentonite, fuller's earth, diatomaceous earth, clay and kaolin.

For liquid compositions a wide variety of solvents can be used with the ketones of this invention. For example, solvents such as hexane, kerosene, petroleum distillates, and the like (including aromatic hydrocarbons such as benzene and aromatic petroleum-based materials) and oxygenated hydrocarbons, desirably alcohols and ketones such as methanol, ethanol, isopropanol, acetone, and the like are satisfactory solvents. It is preferred that the solvent be essentially odorless or have a mild, pleasant odor. Generally the amount of ketone in the carrier ranges from about 0.25 to about 10%, and preferably from about 0.5% to about 5%.

Liquids in which the ketones are insoluble or only sparingly soluble can also be used in the preparation of compositions of this invention. Such liquids will also be referred to from time to time herein as "non-solvents." In such case the composition is in the form of an emulsion or dispersion of the ketone in the non-solvent. Water is a preferred liquid because it is odorless, non-toxic, and readily compatible with the ketones and the surfaces to which such ketones are generally applied.

Such non-solvent containing or aqueous compositions can contain surface active agents such as emulsifiers to disperse or emulsify the ketone in the water or other liquid in which the ketone is insoluble or in which the ketone has only limited solubility. Examples of such surface active agents are alkylarylpolyether alcohols, sodium polyglycolether sulfonates, purified sodium lignosulfonate, sodium lauryl alcohol sulfate, and the like. Within the contemplation of this invention are concentrates suited for dispersion in water to prepare sprayable emulsions. Such concentrates contain a relatively large quantity of the ketonic material of this invention, a small quantity of an emulsifier sufficient to disperse the material in the non-solvent, and an organic solvent of the class described above for the ketone. Such concentrates desirably contain from about 20% to about 60% ketone and from about 2–10% surface active agent, the remainder being the organic solvent. Such concentrates are conveniently diluted with from about 4 to about 99 parts of water for each part of concentrate.

In certain preferred embodiments of this invention, it has been found that the ketones are especially adapted for application from aerosol-type spray cans in conjunction with a self-propellant composition. Such self-propellant comositions are especially effective in dispersing the ketones in the desired area and in controlling animals by repelling them from such sprayed area. While it is possible to use liquids such as water in conjunction with a surface active agent for the self-propellant compositions, it is preferred that the self-propellant aerosol compositions of this invention comprise the ketonic material, a propellant agent, and usually a solvent carrier for the ketone. The solvents used for the ketone are as set forth above. The propellant can be any of the aerosol types including lower hydrocarbons such as propane, gaseous materials such as nitrous oxide, carbon dioxide, and the like, or the halogenated hydrocarbons such as dichlorodifluoromethane, dichlorotetrafluoroethane, chlorotrifluromethane, dichlorofluoromethane, and the like. It is preferred in practicing this invention to utilize nitrous oxide, carbon dioxide, and the halogenated hydrocarbons as propellant agents.

It will be understood that where the propellant agent is a solvent for the ketonic material, it can act in this dual capacity and no further solvent will be necessary. The self-propellant compositions of this invention will generally contain from about 0.5 to about 25% of the ketonic material and from about 2 to about 50% of propellant agent, the remainder being solvent or non-solvent plus emulsifier. Generally, it is prefered that the amount of ketonic material be in the range of from about 1 to about 10% of the self-propellant composition, since lower concentrations of ketones require that the area be very heavily sprayed to obtain the desired repellent activity. On the other hand, if the composition is too concentrated with respect to ketones, the spray will be difficult to control and will result in wasteful over-application of ketone to the area.

It will be understood that the carriers for use herein can also comprise amounts of other adjuvant materials and inert ingredients. For example, the compositions of this invention can also contain perfumes, coloring agents such as dyes and pigments, and the like. It is also possible to admix active ingredients for other purposes with the carrier including for example, miticides such as methoxychlor, insecticides such as DDT, DDE, dieldrin and malathion, herbicides such as 2,4–D and 2,4,5–T, growth regulants such as gibberellins, fungicides such as the thiocarbamates, other animal repellents, and insect repellents. For example, a composition can be specially prepared for use on bushes which contains insecticidal or other agents so that the bushes can be made repellent to domestic animals and treated for other conditions at the same time. Thus, an evergreen bush or shrub could be sprayed with the composition of this invention wherein the carrier contains an insecticide so that the composition would repel dogs and protect the plant against red spider mites at the same time. Further if desired, all or part of the ketonic composition can be encapsulated by well-known techniques to provide a controlled release over a relatively long period of time.

The following examples are given to illustrate preferred embodiments of this invention as it is now preferred to practice it. It will be understood that these examples are illustrative and the invention is not to be considered as restricted thereto except as indicated in the appended claims.

Example I

A cleansing tissue is moistened with several drops of ethylbutyl ketone and then placed under the nose of a collie. The dog evinces a strong aversion to the odor of this material by backing off from the tissue. This test is repeated with similar cleansing tissues containing ethylbutyl ketone utilizing a Great Dane, a Northern Elkhound, two Dachshunds, three common cats, and one Siamese cat. In all of these test cases the animals show their aversion to the ethylbutyl ketone repellent of this invention by leaving the area immediately, backing off, or abruptly pulling their heads away from the tissue. None of the animals so reacts to an untreated cleansing tissue.

Example II

The procedure of Example I is repeated with geranyl acetone on the cleansing tissue. The animals react similarly to this material and demonstrate that it is an effective repellent.

Example III

Methylisoamyl ketone is used to treat cleansing tissues and is tested in the same manner as Example I. The animals exhibit a strong tendency to leave the area or to disassociate themselves from the treated tissues, thus showing the effectiveness of the method of this invention in repelling animals.

When animals are exposed as in Examples I–III to cleansing tissues treated with agents which are ineffective, such as geraniol, $\gamma$-undecalactone, and phenylethylphenyl acetate, the animals either do not react to the tissues or else are actually attracted to them.

Example IV

Isobutyl-n-heptyl ketone is applied to cleansing tissues as described in Example I. When these tissues are held under the noses of two different dogs, the dogs exhibit a desire to disassociate themselves from the area of the tissues.

Example V

The procedure of Example IV is repeated with ethyl-n-amyl ketone. The dogs are repelled from the tissues containing this material.

Example VI

The procedure of Example IV is repeated with methyloctyl ketone. The dogs are repelled by this material.

Example VII

The procedure of Example IV is repeated using heptylidene acetone on the tissues. The dogs are repelled by these treated tissues.

Example VIII

A laboratory hood is divided by solid panels to provide four equally-sized stalls along one wall, the stalls measuring approximately 4' x 4' in area. A food dish and a water dish are placed on steel trays within each stall, and four dogs are allowed free access to all four stalls.

After a two-day familiarization period three of the stalls are treated by spraying the steel trays with a single application of an aerosol composition comprising 1% methylnonyl ketone, 4% nitrous oxide, and 95% isopropanol. The fourth stall is not sprayed with the repellent composition and acts as a control. The food and water consumptions in the stalls are observed, and direct visual observation of the behaviour of the animals is made. The results of the food consumption measurements are shown in Table I.

TABLE I.—FOOD CONSUMPTION (GRAMS)

| Day: | Stall #2 (Control) | Stall #3 (Methylnonyl Ketone) |
|---|---|---|
| 1 | 425 | 130 |
| 2 | 425 | 0 |
| 3 | 425 | 0 |
| 4 | 425 | 0 |

The repellency of all the treated stalls is also quite apparent from visual observation of the test animals.

Example IX

A spray composition is prepared by admixing 2% methylnonyl ketone in 95% isopropanol containing 3% carbon dioxide. This material is packaged in a conventional aerosol spray can. This composition is used to spray most of a row of evergreen trees in an enclosed area. Two dogs are permitted to run in the area containing the trees, and it is found that they avoid the trees sprayed with the aerosol ketone-containing composition of this invention. Prior to spraying the trees, the dogs visited them indiscriminately.

Example X

The composition of Example IX is used to spray a living room couch upon which a mixed breed dog has long been accustomed to sleeping. After the spraying the animal jumps onto the couch, immediately jumps off, and leaves the area. The animal repeatedly attempts to rest on the couch but is repelled each time.

Example XI

The test subject is a short-haired, female, aged cat which is accustomed to frequenting living room couches and chairs. Paper towels are sprayed with the aerosol composition of Example IX, and the treated paper towels are placed on the couch and some of the chairs in the living room. Untreated towels are placed on the other furniture. The cat declines to enter upon the chairs and couch containing the treated towels, but instead chooses to rest only on the furniture containing untreated towels.

In another test the cat's master places a treated towel on his lap. The cat, normally accustomed to jumping onto her master's lap, refused to remain there when the treated paper towel is nearby.

Example XII

An animal repellent composition is prepared by admixing 0.5% methylnonyl ketone with isopropanol. This composition is then used to treat surfaces and is found to repel dogs. Solutions prepared with petroleum distillate and isoparaffinic base oils produce similar results.

Example XIII

An emulsion is prepared by admixing with vigorous agitation 25% methylnonyl ketone with 70% petroleum distillate and 5% polyethylene glycol emulsifier. The emulsion so produced is a concentrated material which is diluted with 24 parts of water to one part of emulsion concentrate. The diluted emulsion is applied to the trunks of trees with a hand sprayer and is found to be repellent to dogs.

Example XIV

A very concentrated emulsion concentrate is prepared by admixing 50% 4-t-butylcyclohexanone with 41% isoparaffinic base oil and 9% phenylpolyethylene glycol with vigorous agitation. This concentrate is then diluted in the ratio of 40 parts of water to 1 part of concentrate, and the emulsion so formed is applied to the base of trees with a hand sprayer. Dogs are repelled from the treated tree trunks.

Example XV

A wettable powder is prepared by thoroughly admixing 25% methylnonyl ketone and 2% of Triton X-120 polyethylene glycol wetting and dispersing agent with 73% attapulgite clay. This material is then dispersed in water in the proportion of one part of the wettable powder to 24 parts of water. The resulting suspended particles are then sprayed onto evergreen bushes by means of a hose applicator. It is found that dogs and cats avoid the area of the treated shubbery and evergreens.

Example XVI

A dust is prepared by adsorbing 2.5% methylheptadecyl ketone on 5% diatomaceous earth and then thoroughly blending the earth with 92.5% talc as a nonabsorbent carrier material. The dusting composition so formed is applied to evergreen shrubbery, and it is found that dogs and cats avoid the area of the treated shrubbery.

Example XVII

A self-propellant pressurized spray is prepared by admixing 5% methylnonyl ketone, 92% specially denatured alcohol, and 3% nitrous oxide. The resulting composition is packaged in aerosol spray cans. The composition is an effective animal repellent.

Example XVIII

A pressurized self-propellant spray composition is prepared by admixing 3.5% methylnonyl ketone, 71.5% isopropanol, and 25% dichlorodifluoromethane. This material is packaged in an aerosol spray can, and is an effective animal repellent when applied to areas or used to treat surfaces.

Example XIX

A self-propellant aerosol composition is prepared by admixing 1% methylnonyl ketone, 95.5% deionized water, 0.5% polyethylene glycol emulsifier, and 3% nitrous oxide. The resulting aerosol spray composition is an effective animal repellent.

What is claimed is:

1. A method for repelling animals which comprises exposing an animal to a repellent amount of at least one ketone which is
   (a) a saturated aliphatic ketone having from 7 to 19 carbon atoms,
   (b) an unsaturated aliphatic ketone having from 7 to 13 carbon atoms, or
   (c) 4-t-amyl cyclohexanone or 4-t-butyl cyclohexanone.

2. The method of claim 1 wherein the ketone is methyl heptyl ketone, methyl nonyl ketone, methyl heptadecyl ketone, or 4-tertiary-amyl cyclohexanone.

3. The method of claim 2 wherein the ketone is contained in a solvent.

4. The method of claim 2 wherein the ketone is contained in an aqueous composition.

5. The method of claim 4 wherein the ketone is methyl nonyl ketone.

References Cited

UNITED STATES PATENTS 2,283,471  5/1942  Swaine.
2,357,260  5/1944  Joyce.
3,159,535  12/1964 Sesso.

ALBERT T. MEYERS, Primary Examiner

S. J. FRIEDMAN, Assistant Examiner